(12) United States Patent  (10) Patent No.: US 7,606,548 B1
Kowalewski  (45) Date of Patent: Oct. 20, 2009

(54) DATA TRANSMISSION METHOD

(75) Inventor: Frank Kowalewski, Salzgitter (DE)

(73) Assignee: IPCOM GmbH & Co. KG, Pullach (DE)

( * ) Notice: Subject to any disclaimer, the term of this patent is extended or adjusted under 35 U.S.C. 154(b) by 1277 days.

(21) Appl. No.: 10/089,395

(22) PCT Filed: Sep. 28, 2000

(86) PCT No.: PCT/DE00/03416

§ 371 (c)(1),
(2), (4) Date: Jul. 17, 2002

(87) PCT Pub. No.: WO01/26261

PCT Pub. Date: Apr. 12, 2001

(30) Foreign Application Priority Data

Sep. 30, 1999 (DE) ................................ 199 46 866

(51) Int. Cl.
*H04B 1/10* (2006.01)
(52) U.S. Cl. ...................................... 455/296
(58) Field of Classification Search ........................ None
See application file for complete search history.

(56) References Cited

U.S. PATENT DOCUMENTS

| 4,995,057 | A |   | 2/1991  | Chung        |         |
|-----------|---|---|---------|--------------|---------|
| 5,113,413 | A | * | 5/1992  | Brown et al. | 375/267 |
| 5,867,491 | A | * | 2/1999  | Derango et al. | 370/329 |
| 6,131,013 | A | * | 10/2000 | Bergstrom et al. | 455/63.1 |
| 6,657,949 | B1 | * | 12/2003 | Jones et al. | 370/205 |
| 6,724,815 | B1 | * | 4/2004  | Jepsen et al. | 375/225 |
| 6,760,589 | B1 | * | 7/2004  | Hobbis | 455/443 |
| 6,816,541 | B1 | * | 11/2004 | Schmidl | 375/148 |

FOREIGN PATENT DOCUMENTS

| DE | 195 18 205 | 9/1996 |
| DE | 198 07 931 | 8/1999 |
| EP | 0281010 | 9/1988 |
| EP | 0 615 352 | 9/1994 |
| GB | 2 329 796 | 3/1999 |

OTHER PUBLICATIONS

Bosch "Mixed Use Of *Joint Predistortion And Joint Detection In the UTRA TDD Mode*", ETSI Tdoc SmG2 UMTS-LI.
Klein et al., *Zero Forcing and Minimum Mean-Square-Error Equalization for Multiuser Detection in Code Division Multiple Access Channels*, IEEE Transportation Vehicle Technology, vol. 45 (1996), 276-287.

* cited by examiner

*Primary Examiner*—Anh-Vu H Ly
(74) *Attorney, Agent, or Firm*—Kenyon & Kenyon LLP

(57) ABSTRACT

A data transmission method in which a data signal is transmitted between transmitter and receiver in the form of a data stream of data bursts in at least two transmission modes, in the first mode a reference signal being transmitted by the transmitter in each data burst and being evaluated in the receiver, and in the second mode no reference signal being transmitted by the transmitter in each data burst. In the second mode, in place of the reference signal, additional redundancy data of the data signal are transmitted in each data burst.

8 Claims, 1 Drawing Sheet

DATA TRANSMISSION METHOD

FIELD OF THE INVENTION

The present invention relates to a data transmission method in which a data signal is transmitted between a transmitter and receiver in the form of a data stream of data bursts in at least two transmission modes, in the first mode a reference signal being transmitted by the transmitter in each data burst, and in the second mode no reference signal being transmitted by the transmitter in each data burst.

Although applicable in principle to any data transmissions, the present invention and the problem underlying it are described with reference to a cellular CDMA data transmission system (CDMA=Code Division Multiple Access), which uses both a transmission mode which requires the transmission of a reference signal as well as one which does not require a reference signal.

BACKGROUND INFORMATION

In transmitting data over multipath channels, the transmitted data symbols create interference at the receiver. The interference can be eliminated in the receiver if the pulse response of the channel is known, such as can be inferred from K. D. Kammeyer, "Communication Transmission," Second Edition, Information Technology Series, Teubner, Stuttgart, 1996, and from A. Klein, G. K. Kaleh, and P. W. Baier, "Zero Forcing and Minimum Mean-Square-Error Equalization for Multiuser Detection in Code Division Multiple Access Channels," IEEE Transportation Vehicle Technology, Volume 45 (1996), 276-287. The channel pulse response can be computed, e.g., in the receiver from a received reference signal.

However, interference can also be eliminated in the transmitter if the channel pulse responses are known there. Then the channel pulse response no longer needs to be computed in the receiver. In other words, transmission of a reference signal is then not necessary.

It is also possible to combine transmission systems that have interference elimination in the receiver and systems that have elimination in the transmitter, as is known from Bosch, "Mixed Use of Joint Predistortion and Joint Detection in the UTRA TDD mode," ETSI Tdoc SMG2 UMTS-L1 205/98.

Because in data transmission systems that support interference elimination both in the receiver and in the transmitter the transmitted reference signal is superfluous when elimination is performed by the transmitter, the transmitted reference signal then occupies transmission capacity unnecessarily. If, when elimination is performed by the transmitter, an individualized transmission format is used, then the corresponding transmission devices are more complex (e.g., as a result of the channel coding designs that become necessary) and/or the data services of the two transmission modes are different.

SUMMARY OF THE INVENTION

The idea underlying the present invention is that the data format for the data to be transmitted in both transmission modes is advantageously selected so as to be identical, and in the mode which does not require a reference signal, in place of this signal, additional redundancy of the data is transmitted.

The method according to the present invention has the particular advantage that an improvement of the radio link can be achieved in the mode in which no reference signal is required, and moreover at very small additional expense.

According to one preferred refinement, the redundancy data transmitted in place of the reference signal are provided through data of the data signal that are transmitted in repetition.

According to another preferred refinement, the data transmitted in repetition are received by the receiver in repetition and are evaluated in the receiver separately.

According to another preferred refinement, the data version of the data transmitted in repetition having the larger receiving signal is selected for further processing and/or for delivery to the user.

According to another preferred refinement, in the second mode, interference is eliminated in the transmitter.

According to another preferred refinement, a plurality of data streams are transmitted simultaneously according to the CDMA method.

According to another preferred refinement, the data bursts have at least two data blocks, between which a block is arranged, which in the first mode is used for the reference signal and in the second mode is used for the redundancy data.

According to another preferred refinement, the data format for the data signals to be transmitted is selected in both transmission modes so as to be identical.

DETAILED DESCRIPTION

Figure 1A:
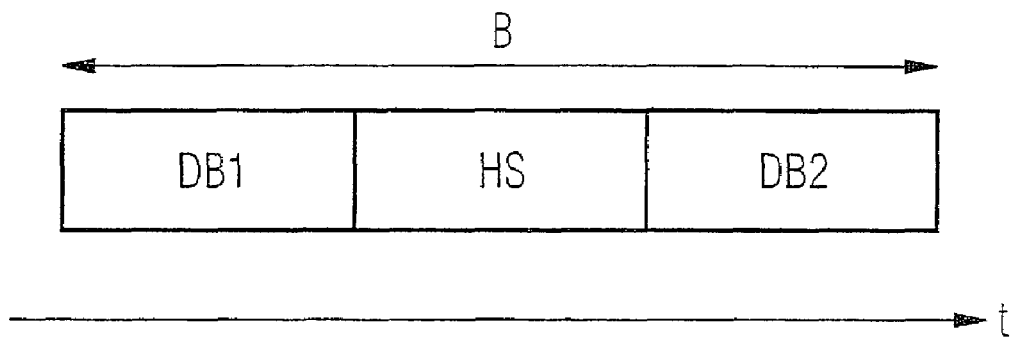
FIG. 1a depicts a first block diagram of a burst structure to explain a specific embodiment of the present invention.
Figure 1B:
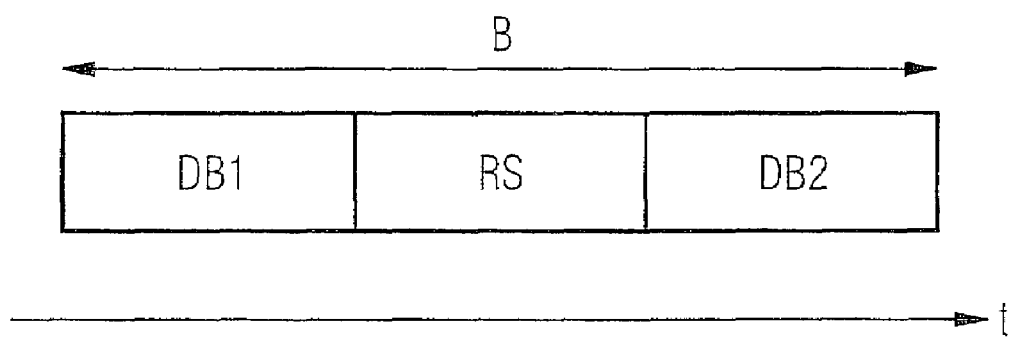
FIG. 1b depicts a second block diagram of a burst structure to explain a specific embodiment of the present invention.
Figure 1C:
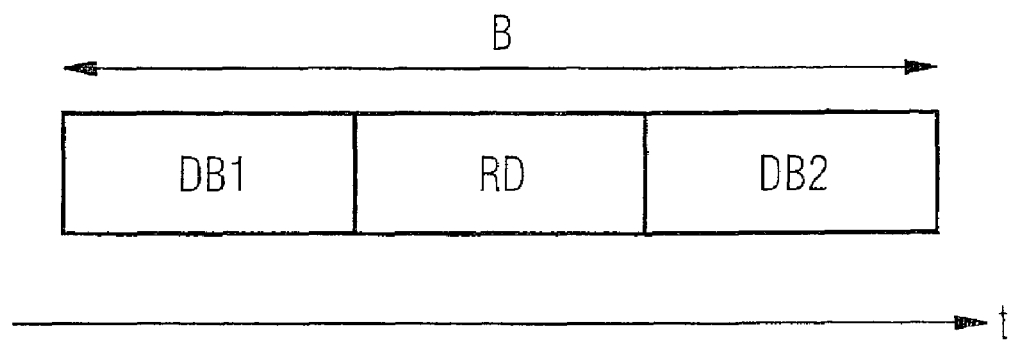
FIG. 1c depicts a third block diagram of a burst structure to explain a specific embodiment of the present invention.

In FIGS. 1a-c, B designates a data burst, t the time, DB1 a first data block, DB2 a second data block, HS an intermediate block for an auxiliary signal, RS a reference signal data block, and RD a redundancy signal data block.

The burst structure according to FIGS. 1a-c is used in a cellular CDMA data transmission system, which operates in time duplex (TDD).

This system has two transmission modes:
- one mode having elimination of interference in the receiver using joint detection in accordance with the teaching of A. Klein, G. K. Kaleh, and P. W. Baier, "Zero Forcing and Minimum Mean-Square-Error Equalization for Multiuser Detection in Code Division Multiple Access Channels," IEEE Transportation Vehicle Technology, Volume 45 (1996), 276-287; and
- one mode B having elimination of interference in the transmitter using joint pre-equalization.

The data are transmitted between transmitter and receiver in bursts B, which include in each case two data blocks DB1 and DB2 and auxiliary signal data block HS situated in between, as is illustrated in FIG. 1a.

The data format for the data signals to be transmitted is selected in both transmission modes so as to be identical.

In mode A, in auxiliary signal data block HS, a reference signal data block RS is transmitted, which is used for computing the channel pulse response in the receiver, as is illustrated in FIG. 1b.

In mode B, in auxiliary signal data block HS, a redundancy signal data block RD is transmitted, i.e., additional data redundancy in the form of repeated data symbols, as is illustrated in FIG. 1c.

Among the multiply transmitted data symbols, the versions having the stronger received signal are selected in the receiver and are further processed (e.g., using a channel decoding), or they are conveyed to the user.

Although the present invention has been described above on the basis of a preferred exemplary embodiment, it is not limited thereto, but rather can be modified in many ways.

In particular, the method according to the present invention can be used in all data transmission systems which use both a transmission mode which requires the transmission of a reference signal as well as a transmission mode which does not require a reference signal, and it is not limited to CDMA data transmission systems.

In addition, any criterion for the selective further processing or delivery of the redundancy data can be used.

What is claimed is:

1. A data transmission method, comprising:
   transmitting a data signal between a transmitter and a receiver as a data stream of data bursts in either a first transmission mode or a second transmission mode;
   in the first transmission mode, transmitting a reference signal by the transmitter in each data burst, the reference signal being evaluated in the receiver; and
   in the second transmission mode, avoiding transmitting the reference signal by the transmitter in each data burst and instead transmitting additional redundancy data of the data signal in each data burst;
   wherein a selection between the first transmission mode and the second transmission mode is made, said selection being dependent on whether interference elimination is performed at the receiver or at the transmitter.

2. The method according to claim 1, wherein:
   the additional redundancy data are provided by data of the data signal that are transmitted in repetition.

3. The method according to claim 2, wherein:
   the data transmitted in repetition are received in repetition by the receiver and are evaluated separately in the receiver.

4. The method according to claim 3, further comprising:
   selecting a data version of the data transmitted in repetition having a stronger received signal for at least one of further processing and delivery to a user.

5. The method according to claim 1, further comprising:
   in the second transmission mode, eliminating interference in the transmitter.

6. The method according to claim 1, further comprising:
   transmitting a plurality of data streams simultaneously according to a CDMA technique.

7. The method according to claim 1, wherein:
   the data bursts have at least two data blocks, between which a block is arranged which is used, in the first transmission mode, for the reference signal, and which is used, in the second transmission mode, for the additional redundancy data.

8. The method according to claim 1, further comprising:
   selecting a data format for the data signal to be transmitted in both the first transmission mode and the second transmission mode so as to be identical.

* * * * *

UNITED STATES PATENT AND TRADEMARK OFFICE
CERTIFICATE OF CORRECTION

PATENT NO. : 7,606,548 B1  Page 1 of 1
APPLICATION NO. : 10/089395
DATED : October 20, 2009
INVENTOR(S) : Frank Kowalewski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1917 days.

Signed and Sealed this

Twelfth Day of October, 2010

David J. Kappos
*Director of the United States Patent and Trademark Office*